(12) United States Patent
Lynch et al.

(10) Patent No.: US 8,814,575 B2
(45) Date of Patent: Aug. 26, 2014

(54) ELECTRICAL CONNECTOR ASSEMBLY INCLUDING HOOPS AND HOOKS

(75) Inventors: Stephen Brian Lynch, Portola Valley, CA (US); Fletcher Rothkopf, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 842 days.

(21) Appl. No.: 12/715,685

(22) Filed: Mar. 2, 2010

(65) Prior Publication Data

US 2011/0217854 A1 Sep. 8, 2011

(51) Int. Cl.
*H01R 12/00* (2006.01)

(52) U.S. Cl.
USPC .......................................................... 439/74

(58) Field of Classification Search
USPC ...................... 439/74, 66, 774, 174
See application file for complete search history.

(56) References Cited

U.S. PATENT DOCUMENTS

| | | | | |
|---|---|---|---|---|
| 4,239,046 A * | 12/1980 | Ong | ............................... | 600/391 |
| 5,136,470 A * | 8/1992 | Sheridon et al. | ............... | 361/749 |
| 5,694,296 A * | 12/1997 | Urbish et al. | .................. | 361/774 |
| 5,774,341 A * | 6/1998 | Urbish et al. | .................. | 361/774 |
| 5,906,507 A * | 5/1999 | Howard | ......................... | 439/501 |
| 6,287,126 B1 * | 9/2001 | Berger et al. | ................... | 439/66 |
| 6,439,495 B1 * | 8/2002 | Bolen et al. | ................... | 242/388 |
| 7,204,704 B2 * | 4/2007 | Yamamoto | ..................... | 439/174 |

* cited by examiner

*Primary Examiner* — Amy Cohen Johnson
*Assistant Examiner* — Vladimir Imas

(57) ABSTRACT

Apparatus, systems and methods for forming a connector assembly that includes hoops and hooks designed to engage each other are disclosed. According to one aspect, a connector assembly includes a first substrate and a second substrate. The first substrate includes a plurality of hooks arranged in a hook area. The hooks include at least one hook that is arranged to form an electrical contact. The second substrate includes a plurality of hoops arranged in a hoop area. The hoops include at least one hoop that is arranged to form the electrical contact. The hook interfaces with the hoop to form the electrical contact.

23 Claims, 9 Drawing Sheets

ELECTRICAL CONNECTOR ASSEMBLY INCLUDING HOOPS AND HOOKS

FIELD OF THE INVENTION

The present disclosure relates generally to assembly processes for electrical parts and, more particularly, to providing redundant connections in such electrical parts.

BACKGROUND OF THE INVENTION

Devices, e.g., electrical devices, are typically formed from various components which are assembled together. At times, it may be difficult to assemble various components together in such a way as to facilitate electrical connections between the various components. On occasion, after a device is assembled, it may become necessary to disassemble, or otherwise decouple, components of the device. For example, it may become necessary to disassembled components of a device when one component fails and, therefore, must be replaced. Decoupling components often proves to be difficult, as some components may not be arranged to be readily disassembled from other components.

Therefore, what is needed is a method and an apparatus that enable components of an electrical device to be readily assembled and disassembled.

SUMMARY

The invention pertains to apparatus, systems and methods for providing redundant electrical connections in electrical parts.

The invention may be implemented in numerous ways, including, but not limited to including, as a method, system, device, or apparatus (including computer readable medium). Several embodiments of the invention are discussed below.

According to one aspect, a connector assembly includes a first substrate and a second substrate. The first substrate includes a plurality of hooks arranged in a hook area. The hooks include at least one hook that is arranged to form an electrical contact. The second substrate includes a plurality of hoops arranged in a hoop area. The hoops include at least one hoop that is arranged to form the electrical contact. The hook interfaces with the hoop to form the electrical contact.

In one embodiment, the first substrate and the hooks are formed from metal, and the hooks are compliant. In another embodiment, the hoops are coupled to the second substrate using wire bonding.

According to another aspect, a method for forming a hook and hoop connector assembly includes obtaining a first substrate and obtaining a second substrate. The first substrate includes a plurality of hooks arranged in a hook area. At least one hook is arranged to form an electrical contact. The second substrate includes a plurality of hoops arranged in a hoop area. The hoops include at least one hoop that is arranged to form the electrical contact. The method also includes aligning the hook area with respect to the hoop area, and applying a force to engage the at least one hook with the at least one hoop to form the electrical contact.

In accordance with still another aspect, a hook and hoop connector assembly includes a first substrate that includes a plurality of electrically conductive hooks arranged in a hook area. The hook and hoop connector assembly also includes a second substrate having a plurality of electrically conductive hoops arranged in a hoop area. The electrically conductive hooks are arranged to engage with the electrically conductive hoops to form at least a first electrical contact. The electrically conductive hooks and the electrically conductive hoops are configured to provide redundancy.

Other aspects and advantages of the invention will become apparent from the following detailed description taken in conjunction with the accompanying drawings which illustrate, by way of example, the principles of the invention.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations associated with the specification.

FIG. 10 is a process flow diagram which illustrates a method of disassembling an assembly, e.g., an electrical connector assembly, in accordance with one embodiment.

DETAILED DESCRIPTION OF EMBODIMENTS OF THE INVENTION

Figure 1A:
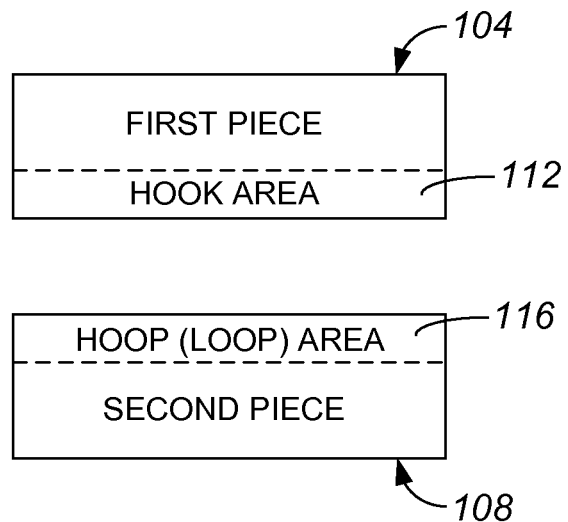
FIG. 1A is a block diagram representation of a first substrate which includes a series of hooks and a second substrate which includes a series of hoops prior to the series of hooks being engaged with the series of hoops in accordance with one embodiment.

The invention pertains to apparatus, systems and methods for providing an electrical connector which includes a connection area formed from a series of hoops and a connection area formed from a series of hooks or loops. The series of hoops are configured be interfaced with, e.g., to engage with or be assembled to, the series of hooks such that electrical connections associated with an electrical connector are formed between hoops and hooks. The hoops and hooks may be electrical contacts, i.e., the hoops and hooks may be electrically conductive, and may be configured to provide redundancy. For instance, multiple hoops and hooks may be arranged to provide electrical connections between the same components or features such that if one connection fails, a redundant connection may maintain the electrical connection.

In one embodiment, the series of hoops and the series of hooks are arranged to be disassembled and reassembled, as appropriate. By way of example, when the series of hooks are on a substrate associated with a component, disassembling the series of hooks may be associated with a process of replacing the component or otherwise swapping out the component.

The apparatus, systems, and methods described herein allow for the formation of a series of hooks and a series of hoops, as well as the assembly of a part, e.g., an electrical connector, that includes the series of hooks and the series of hoops. Electrical connectors that include series of hooks and series of hoops may be included in small form factor electronic devices such as handheld electronic devices, as for example mobile phones, media players, user input devices (e.g., mouse, touch sensitive devices), personal digital assistants, remote controls, etc. The apparatus, systems, and methods may also be used for glass covers or displays for other relatively larger form factor electronic devices such as portable computers, tablet computers, displays, monitors, televisions, etc.

Embodiments are described herein in the context of forming hooks and/or hoops on substrates, as well as engaging hooks and hoops. The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Referring initially to FIG. 1A, a first piece or substrate which includes a series of hooks and a second piece or substrate which includes a series of hoops will be described in accordance with an embodiment of the invention. A first piece 104 includes a hook area 112, or an area that includes a series of hooks. Within hook area 112, hooks may be arranged in any suitable orientation. By way of example, hooks within hook area 112 may be arranged in, but are not limited to be arranged in, a series configuration or an array configuration such that there is at least one row of hooks within hook area 112. A second piece 108 includes a hoop or loop area 116 that includes a series of hoops or loops. Hoops or loops within hoop or loop area 116 may be configured in a variety of different orientations. In general, hoops or loops within hoop or loop area 116 are arranged such that when first piece 04 and second piece 108 are engaged together or otherwise assembled, hoops or loops in hoop or loop area 116 engage hooks of hook area 112.

Figure 1B:
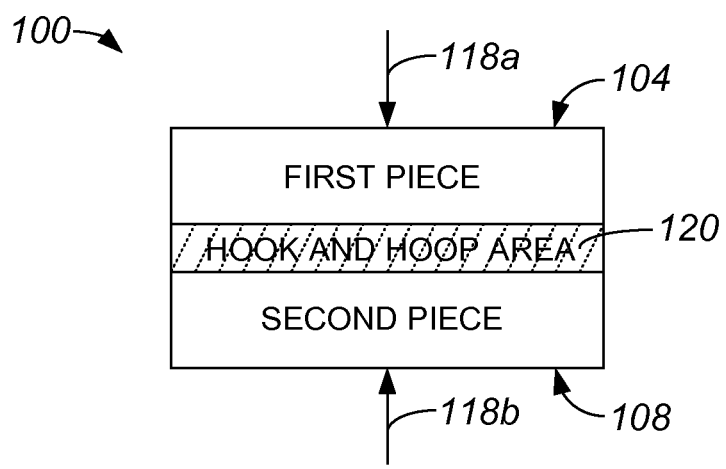
FIG. 1B is a block diagram representation of a connector assembly formed when a first substrate and a second substrate, e.g., first substrate 104 and second substrate 108 of FIG. 1A, are substantially engaged in accordance with one embodiment.

In one embodiment, first piece 104 and second piece 108 may be arranged to form a connector assembly when hook area 112 is substantially interfaced with hoop or loop area 116, i.e., when hooks in hook area 112 are substantially interfaced with hoops or loops in hoop or loop area 116. Such a connector assembly may be an electrical connector assembly, and hooks and hoops or loops may be arranged to provide electrical connections when hook area 112 is substantially interfaced with hoop or loop area 116. FIG. 1B is a diagrammatic representation of a connector assembly, e.g., a "hook and hoop" connector assembly, formed from first piece 104 and second piece 108 in accordance with an embodiment of the invention. A connector assembly 100 may be formed when a force 118a is applied to first piece 104 and/or a force 118b is applied to second piece 108 to cause first piece 104 to engage with second piece 108.

When first piece 104 is engaged with second piece 108, an interface area 120, or an interconnect area, is substantially formed. Interface area 120 is formed when hooks in hook area 112 effectively connect with hoops or loops in hoop or loop area 116. Thus, interface area 120 is generally an area in which hooks and hoops or loops are engaged or otherwise interconnected.

Figure 1C:
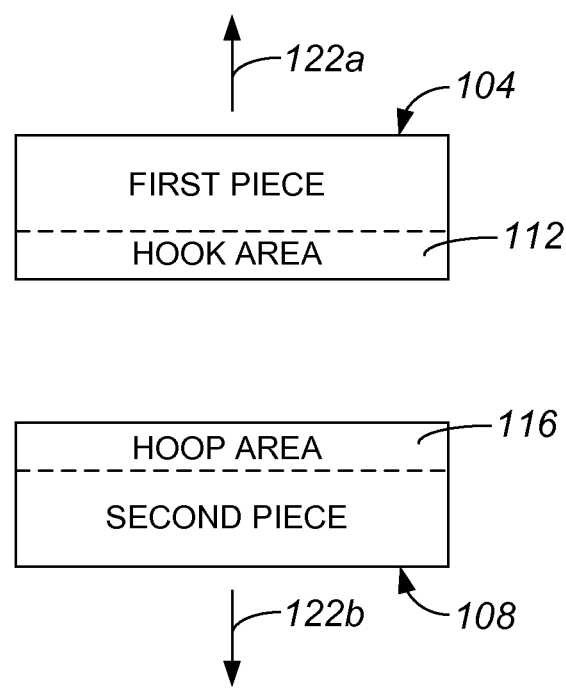

Connector assembly 100 may be arranged to be disassembled. That is, hooks in hook area 112 may be disengaged from hoops or loops in hoop or loop area 116. FIG. 1C is a diagrammatic representation of first piece 104 and second piece 108 after connector assembly 100 has been substantially disassembled in accordance with an embodiment of the invention. To disengage first piece 104 from second piece 108, at least one force 122a, 122b may be applied to cause hooks in hook area 112 to disengage from hoops or loops in hoop or loop area 116. It should be appreciated that in addition to, or in lieu of, applying at least one force 122a, 122b to disengage first piece 104 from second piece 108, torques may be applied to disengage first piece 104 from second piece 108.

Figure 2:
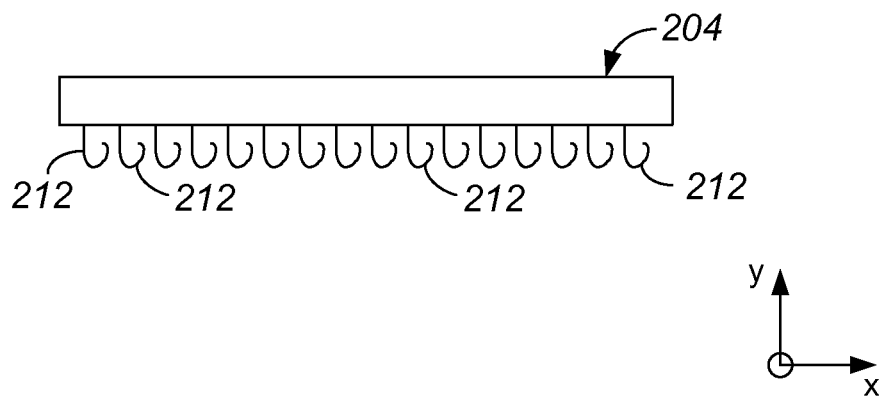
FIG. 2 is a diagrammatic side-view representation of a substrate with a series of hooks in accordance with one embodiment.

FIG. 2 is a diagrammatic side-view representation of a piece or a substrate with a series of hooks in accordance with an embodiment of the invention. A piece 204 includes a series of hooks 212. The number of hooks 212, as well as the configuration of hooks 212, included in piece 204 may vary widely. Hooks 212 may be oriented such that there is a spacing between adjacent hooks 212 of between approximately 100 microns and approximately 200 microns, as for example approximately 150 microns. Additionally, hooks 212 may have a thickness of between approximately 100 microns and approximately 500 microns, as for example approximately 200 microns.

In general, hooks 212 and piece 204 may be formed from metal, and hooks 212 may be compliant such that hooks 212 may deform at least slightly under the application of a force or a torque. Hooks 212 may be arranged to deform slightly in order to engage hoops (not shown). In one embodiment, hooks 212 may be formed from a material with a relatively high elasticity.

Hooks 212 may be integrally formed with respect to piece 204. That is, hooks 212 may be created from piece 204, e.g., by melting and forming piece 204. Alternatively, hooks 212 may be features that are attached to piece 204, e.g., using a wire-bonding process.

Figure 3:
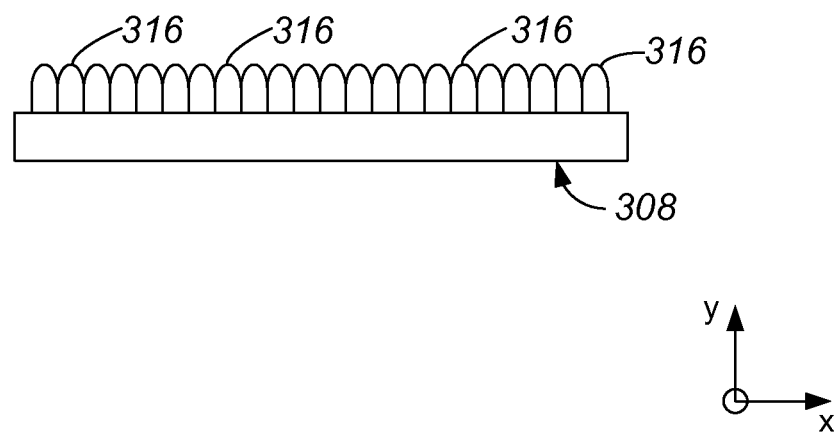
FIG. 3 is a diagrammatic side-view representation of a substrate with a series of hoops or loops in accordance with one embodiment.
Figure 11:
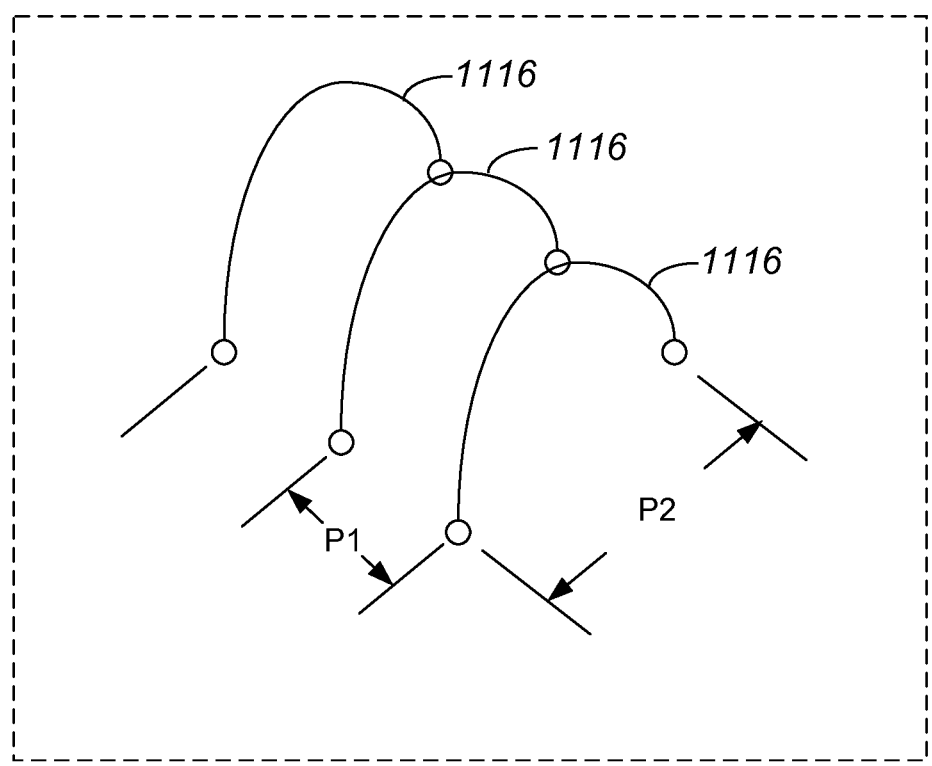
FIG. 11 is a diagrammatic representation of hoops or loops, in accordance with one embodiment.

FIG. 3 is a diagrammatic side-view representation of a piece or a substrate with a series of hoops or loops in accordance with an embodiment of the invention. A piece 316 includes a plurality of hoops or loops 316. Piece 316 and plurality of hoops or loops 316 may be formed from a complaint metal. Hoops or loops 316 may, in one embodiment, have pitches on the order of approximately 20 microns or more. For example, referring to FIG. 11, hoops or loops 1116 may have a lateral pitch P1 on the order of approximately 35 microns or more and a pitch P2 of approximately 150 microns or more. Returning to FIG. 3, hoops or loops 316 are generally formed from pieces of wire that are coupled to piece 308, as for example through the use of a wire bonding process.

Figure 4:
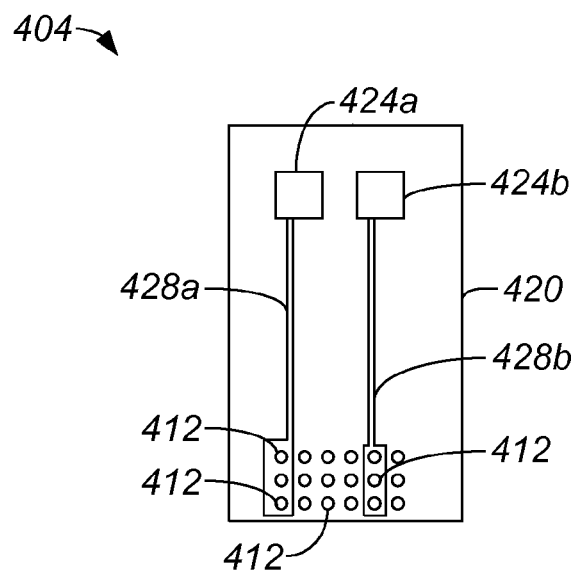
FIG. 4 is a diagrammatic top-view representation of a substrate that includes a series of hooks in a hook area in accordance with one embodiment.

A piece with hooks and a piece with hoops or loops may be arranged to be included as a part of an overall apparatus such as an electrical device. A piece with hooks may be arranged to be coupled to a piece with hoops or loops within the overall apparatus. In one embodiment, hooks may be included on a substrate that includes electrical components that are to be electrically coupled to electrical components on a substrate that includes hoops. FIG. 4 is a diagrammatic top-view representation of a substrate that includes a series of hooks in a hook area in accordance with an embodiment of the invention. A substrate 404 may be any substrate on which hooks 412 are formed or attached. Hooks 412 may generally be arranged as an array in a hook area of substrate 404.

In one embodiment, substrate 404 may be a printed circuit board on which components 424a, 424b are mounted. Components 424a, 424b are coupled to some hooks 412 through traces 428a, 428b, respectively. As will be understood by those skilled in the art, traces 428a, 428b are often metallic traces that are arranged to provide signals, e.g., electrical signals or ground signals, to and from components 424a, 424b, respectively. In one embodiment, components 424a, 424b may be integrated circuits.

As shown, multiple hooks 412 are communicably coupled to each component 424a, 424b. By coupling multiple hooks 412 to component 424a, for example, redundancy is provided such that if a connection associated with one hook 412 fails, other hooks 412 coupled to component 424a may still deliver signals to and obtain signals from component 424a.

Figure 5:
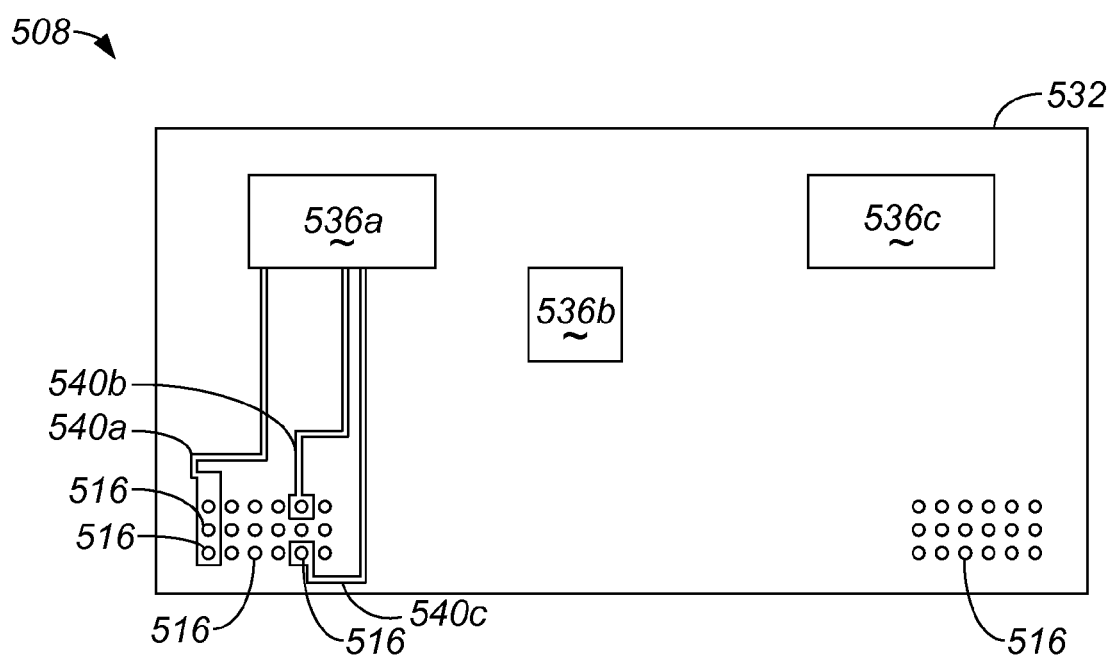
FIG. 5 is a diagrammatic top-view representation of a substrate that includes a series of hoops in a hoop area in accordance with one embodiment.

As mentioned above, hoops or loops may be included as a part of a substrate that is to be coupled or otherwise interfaced with a substrate that includes hooks. FIG. 5 is a diagrammatic top-view representation of a substrate that includes a series of hoops in a hoop area in accordance with an embodiment of the invention. A substrate 508 includes multiple hoops 516 generally arranged in an area in a hoop area of substrate 508. As shown, substrate 508 may include more than one hoop area. Hoops 516 are arranged to engage hooks, e.g., hooks 412 of FIG. 4, such that hoops 516 and hooks 412 may be communicably coupled or otherwise interfaced.

Components 536a-c are mounted on, or otherwise coupled to, substrate 508. Components 536a-c may be electrical components such as integrated circuits, although it should be appreciated that components 536a-c are not limited to being electrical components. Traces 540a-c are effectively arranged to carry signals, e.g., electrical signals or currents, between component 536a and hoops 516. It should be appreciated that while components 536b, 536c typically also have traces that connect components 536b, 536c to hoops 516, such traces are not shown for ease of illustration.

Multiple hoops 516 are communicably coupled component 536a through trace 540a. By coupling multiple hoops 516 to component 536a through trace 540a, redundancy is provided such that if a connection associated with one hoop 516 coupled to component 536a through trace 540a fails, other hoops 516 coupled to component 536a through trace 540a may still deliver signals to and obtain signals from component 536a via trace 540a.

Figure 6:
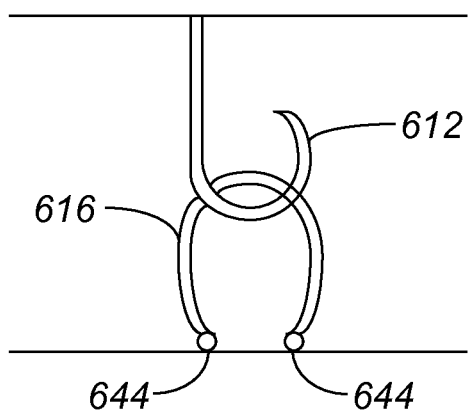
FIG. 6 is a diagrammatic representation of a hook engaged with a hoop or a loop in accordance with one embodiment.

FIG. 6 is a diagrammatic representation of a hook engaged with a hoop or a loop in accordance with an embodiment of the invention. A hook 612 is configured to essentially hook through a hoop or a loop 616 that includes bonds 644 which couple hoop or loop 616 to a substrate. When hook 612 is essentially hooked through hoop or loop 616, hook 612 is in contact with hoop or loop 616. The contact may be electrical contact such that a signal passing through hook 612 also passes through hoop or loop 616, and vice versa. The signal passing through hook 612 and hoop or loop 616 may be, but is not limited to being, an electrical signal or a ground signal. It should be appreciated that the contact between hook 612 and hoop or loop 616 typically includes physical contact, i.e., hook 612 and hoop or loop 616 generally touch each other.

Figure 7:
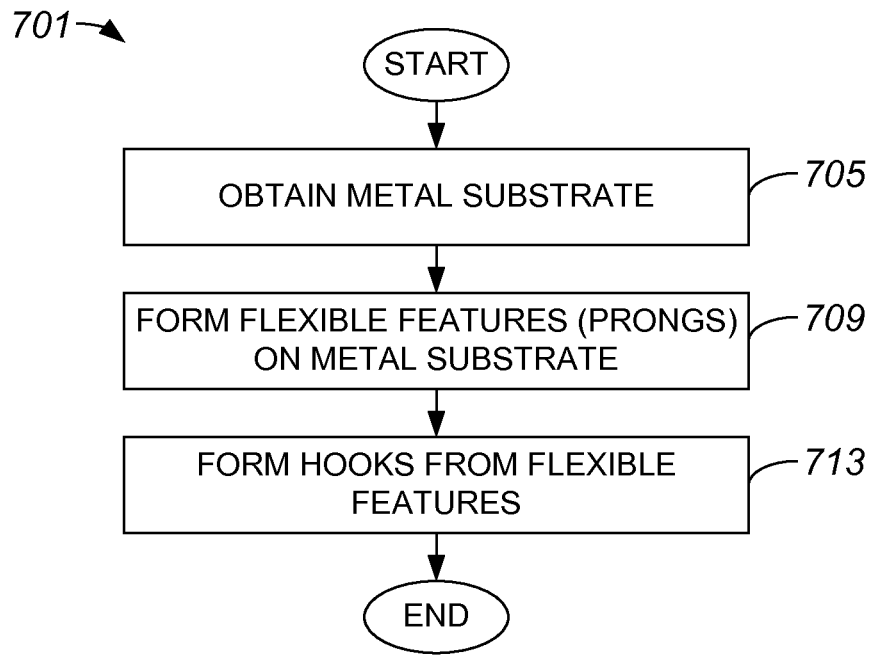
FIG. 7 is a process flow diagram which illustrates a method of creating a substrate with a series of hooks in accordance with one embodiment.

Referring next to FIG. 7, a method of creating a piece or a substrate with a series of hooks will be described in accordance with an embodiment of the invention. A method 701 of creating a substrate with at least one hook begins at step 705 in which a metal substrate is obtained. The metal substrate may be, but is not limited to being, a substrate on which at least one integrated circuit is mounted. After the metal substrate is obtained, flexible features, e.g., prongs, are formed on the metal substrate in step 709. In general, any suitable method may be used to form the flexible features. The flexible features may be formed from the metal substrate, e.g., by melting and molding the metal substrate. That is, the flexible features may be substantially integrally formed from the metal substrate. Alternatively, the flexible features may be formed by attaching external structures to the metal substrate, e.g., using a wire bonding process. In other words, the flexible features may be separate features which are coupled to the metal substrate. It should be appreciated that forming flexible features may include, but is not limited to including, determining dimensions of the features such as the height of the flexible features and determining a spacing between adjacent flexible features.

Once the flexible features are formed on the metal substrate, hooks are formed from the flexible features in step 713. The hooks may generally be formed by deforming the flexible features into the shape of hooks. By way of example, hooks may be formed by heating the flexible features and then bending the flexible features. Bending the flexible features may include, in one embodiment, molding heated flexible features in a mold that is arranged to provide a curvature to the flexible features. Upon forming hooks from the flexible features, the method of creating a substrate with at least one hook is completed.

Figure 8:
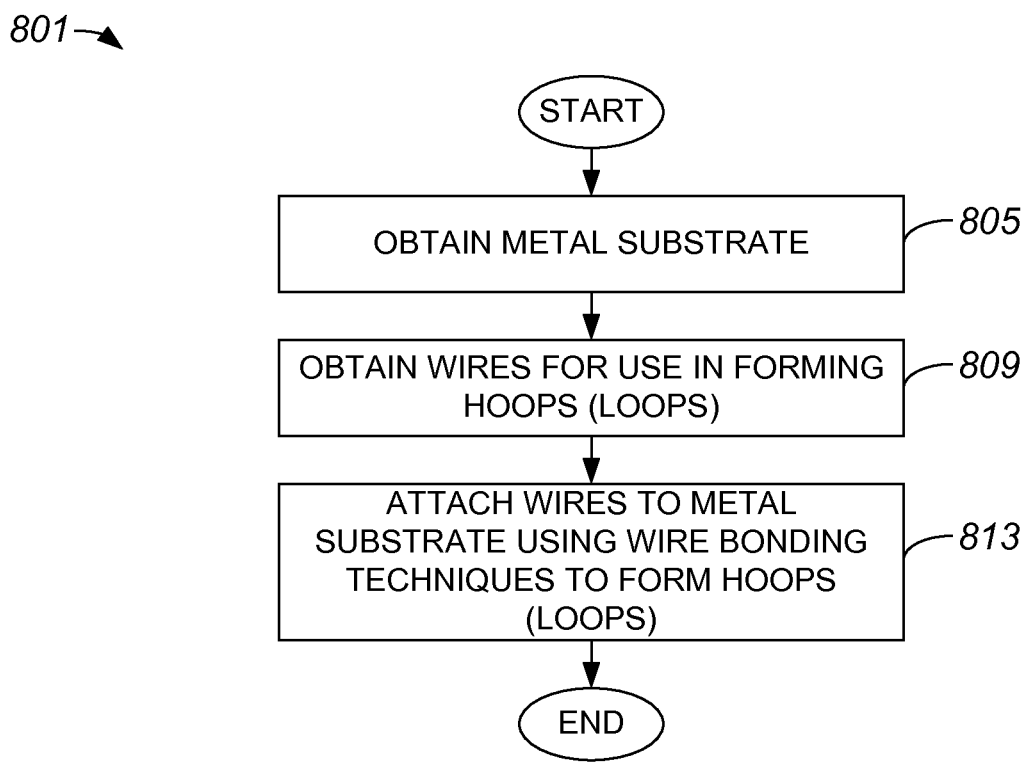
FIG. 8 is a process flow diagram which illustrates a method of creating a substrate with a series of hoops in accordance with one embodiment.

With reference to FIG. 8, a method of creating a substrate with at least one hoop or loop arranged to engage a hook will be described in accordance with an embodiment of the invention. A method 801 of forming a substrate with at least one hoop begins at step 805 in which a metal substrate is obtained. Once the metal substrate is obtained, wires which are to be used in forming hoops are obtained in step 809. Obtaining the wires may include bending the wires to form hoops. The wires are then attached in step 813 to the metal substrate such that hoops may be formed. Although the wires may be attached to metal substrate using any suitable method, wires are typically attached using wire bonding techniques including, but not limited to including, ball bonding techniques, wedge bonding techniques, and/or other techniques such as anisotropic conductive film (ACF) bonding techniques. Attaching the wires includes determining locations at which the wires are to be attached, and positioning the wires in those locations. After the wires are attached to the metal substrate, the method of forming a substrate with at least one hoop is completed.

Figure 9:
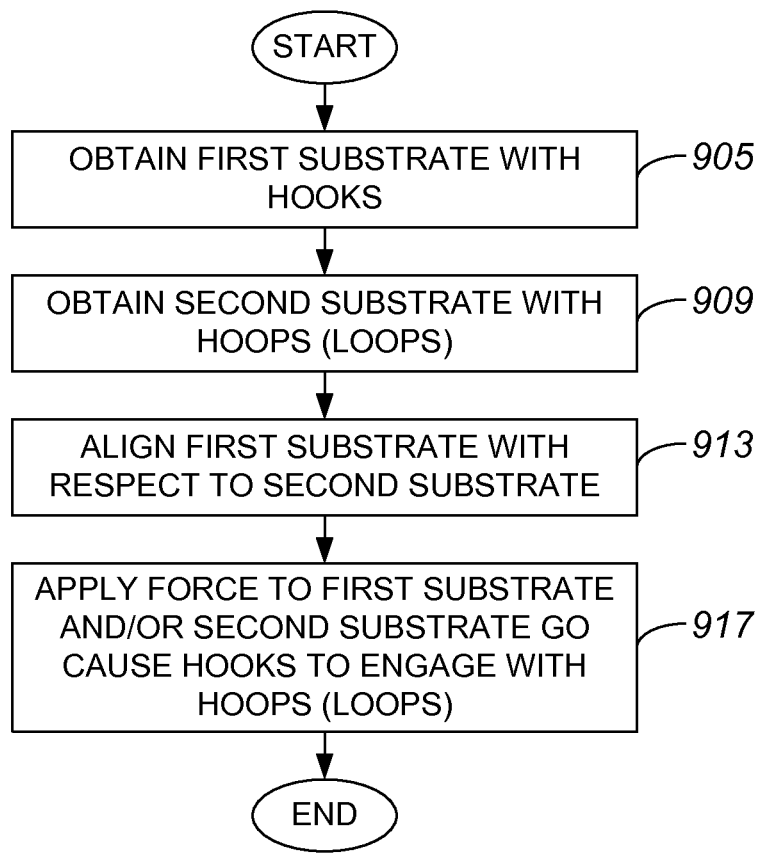
FIG. 9 is a process flow diagram which illustrates a method of creating an assembly, e.g., an electrical connector assembly, in accordance with one embodiment.

As previously mentioned, a substrate with at least one hook and a substrate with at least one hoop may be components of an overall electrical connector assembly. When a hook is engaged with a hoop, an electrical connection is substantially established. FIG. 9 is a process flow diagram which illustrates a method of creating an assembly, e.g., an electrical connector assembly, in accordance with an embodiment of the invention. A method 901 of creating an assembly begins when a first substrate with at least one hook is obtained in step 905 and a second substrate with at least one hoop or loop is obtained in step 909.

After the substrates are obtained, the first substrate is aligned with respect to the second substrate in step 913. Aligning the first substrate with respect to the second substrate includes positioning the first substrate and the second substrate such that a hook on the first substrate is positioned substantially under or substantially over a hoop on the second substrate. That is, the first substrate may be aligned with respect to the second substrate by positioning a hook area of the first substrate substantially under or substantially over a hoop area of the second substrate. In one embodiment, the first substrate and the second substrate may include alignment features, e.g., mechanical structures, that are configured to facilitate the alignment of the first substrate with respect to the second substrate. For example, when an alignment feature on the first substrate and an alignment feature on the second substrate are in contact, then the first substrate may be aligned or properly oriented with respect to the second substrate.

Once the first substrate is aligned with respect to the second substrate, a force is applied in step 917 to the first substrate and/or the second substrate to cause at least one hook on the first substrate to engage with at least one hoop on the second substrate. The application of force, e.g., a compression force, may generally cause the hook and/or the hoop, which are relatively compliant, to deflect in order to enable the hook and the hoop to engage. In one embodiment, when the first substrate and the second substrate include alignment features, applying force may cause the alignment features to engage or to otherwise interface with each other. It should be appreciated that an engagement between a hook and a hoop is generally temporary, as is any engagement between alignment features. Upon applying for to cause a hook of the first substrate to engage with a hoop of the second substrate, the method of creating an assembly is completed.

Figure 10:
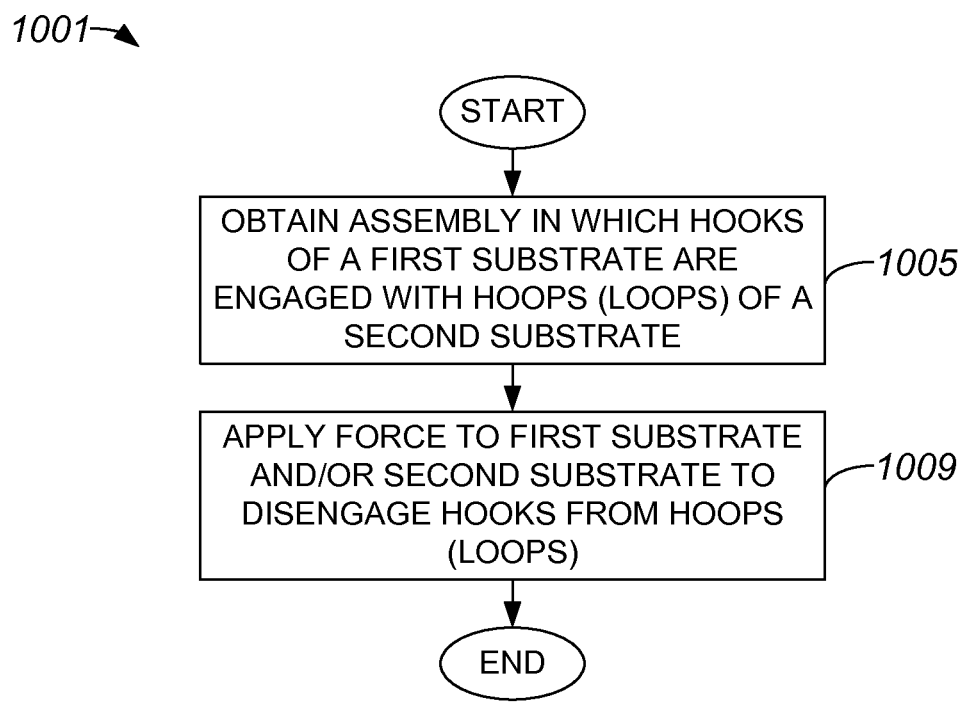
FIG. 10 is a block diagram representation of a first substrate and a second substrate, e.g., first substrate 104 and second substrate 108 of FIG. 1A, after a connector assembly, e.g., connector assembly 100 of FIG. 1B, has been substantially disengaged in accordance with one embodiment.

An assembly, e.g., an assembly formed using the method of FIG. 9, may be readily disassembled. Disassembling an assembly may be desirable, for example, if a component of the assembly fails and, thus, needs to be removed from the assembly in order to be replaced or in order to be repaired. To disassemble an assembly that includes a hook engaged with a hoop, the hook is typically disengaged from the hoop. FIG. 10 is a process flow diagram which illustrates a method of disassembling an assembly, e.g., an electrical connector assembly, in accordance with an embodiment of the invention. A method 1001 of disassembling an assembly begins at step 1005 in which an assembly is obtained. The assembly includes a first substrate with at least one hook that is engaged with at least one hoop of a second substrate.

In step 1009, a force is applied to the first substrate and/or the second substrate to disengage the hook from the hoop. It should be appreciated that in addition to applying a force, a torque or a moment may also be applied. For example, a compressive force may be applied to away from the hoop, and another force may be applied to remove the first substrate from over or under the second substrate. Upon disengaging the hook from the hoop, the process of disassembling an assembly is completed.

A connector assembly which utilizes a substrate with hooks and a substrate with hoops or loops may be included in an electronic device. Such connectors may be utilized with respect to a variety of electronic devices including, but not limited to including, handheld electronic devices, portable electronic devices and substantially stationary electronic devices. Examples of these include any known consumer electronic device that includes components which are electrically connected, and may benefit from connections which have redundancy and may be disassembled. By way of example, and not by way of limitation, an electronic device which includes a connector assembly that includes a hook arrangement that substantially interfaces with a hoop arrangement may correspond to media players, mobile phones (e.g., cellular phones), user input device (e.g., mouse, touch-sensitive devices), PDAs, remote controls, notebooks, tablet PCs, monitors, all in one computers and the like.

Although only a few embodiments of the invention have been described, it should be understood that the invention may be embodied in many other specific forms without departing from the spirit or the scope of the invention. By way of example, although an electrical connection may be formed between hooks associated with one substrate and hoops associated with another substrate, an electrical connection may be arranged to instead be formed between hooks associated with one substrate and hooks associated with another substrate. That is, hooks may be utilized in lieu of hoops in some embodiments.

A hook area is not limited to including hooks which are arranged to form electrical contacts with hoops. Similarly, a hoop area is not limited to including hoops which are arranged to form electrical contacts with hooks. For example, some hooks may be arranged to engage hoops without forming electrical contacts. Rather than forming electrical contacts, some hooks may engage with hoops to provide physical contact without providing electrical contact to effectively strengthen the engagement between a substrate that includes the hooks and a substrate that includes the hoops.

In general, the steps associated with the methods of the invention may vary widely. Steps may be added, removed, altered, combined, and reordered without departing from the spirit or the scope of the invention. By way of example, FIG. 7 includes a step of forming hooks from flexible features. It should be appreciated that in one embodiment, flexible features that are bonded to a metal substrate may already include hook portions. If flexible features include hook portions prior to being bonded to a metal substrate, that it may not be necessary to form hooks from the flexible features.

The various aspects, features, embodiments or implementations of the invention described above may be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

In one embodiment, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

While embodiments and applications have been shown and described, it would be apparent to those skilled in the art having the benefit of this disclosure that many more modifications than mentioned above are possible without departing from the inventive concepts herein.

What is claimed is:

1. A connector assembly comprising:
a first substrate;
a plurality of hooks arranged in a hook area on the first substrate, the plurality of hooks including at least one hook that is arranged to form an electrical contact;
a second substrate;
a plurality of hoops arranged in a hoop area on the second substrate, the plurality of hoops including at least one hoop that is arranged to form the electrical contact; and
at least one first alignment feature on the first substrate and at least one second alignment feature on the second substrate, the at least one first alignment feature and the at least one second alignment feature configured to align the hook area with the respect to the hoop area,
wherein the at least one hook interfaces with the at least one hoop to form the electrical contact.

2. The connector assembly of claim 1 wherein the first substrate includes at least a first electrical component communicably coupled to the at least one hook and the second substrate includes at least a second electrical component communicably coupled to the at least one hoop.

3. The connector assembly of claim 1 wherein the first substrate and the plurality of hooks are formed from metal, and wherein plurality of hooks is a plurality of compliant hooks.

4. The connector assembly of claim 1 wherein the second substrate and the plurality of hoops are formed from metal, and wherein the plurality of hoops is a plurality of compliant hoops.

5. The connector assembly of claim 1 wherein the at least one hook is arranged to interface with the at least one hoop to from the electrical contact by physically contacting the at least one hoop.

6. The connector assembly of claim 1 wherein the plurality of hooks is integrally formed on the first substrate and the plurality of hoops is bonded to the second substrate.

7. The connector assembly of claim 6 wherein the plurality of hoops is bonded to the second substrate using a wire bonding process.

8. A method for forming a hook and hoop connector assembly, the method comprising:
obtaining a first substrate, the first substrate including a plurality of hooks arranged in a hook area, the plurality of hooks including at least one hook that is arranged to form an electrical contact;
obtaining a second substrate, the second substrate including a plurality of hoops arranged in a hoop area, the plurality of hoops including at least one hoop that is arranged to form the electrical contact;
aligning the hook area with respect to the hoop area by aligning at least one alignment feature; and
applying a force to engage the at least one hook with the at least one hoop to form the electrical contact.

9. The method of claim 8 wherein the first substrate includes a first mechanical feature and the second substrate includes a second mechanical feature, and wherein aligning the hook area with respect to the hoop area includes aligning the first mechanical feature with respect to the second mechanical feature.

10. The method of claim 8 wherein the at least one hook is compliant, and wherein applying the force to engage the at least one hook with the at least one hoop to form the electrical contact includes applying a first force to the first substrate.

11. The method of claim 8 wherein the at least one hoop is compliant, and wherein applying the force to engage the at least one hook with the at least one hoop to form the electrical contact includes applying a first force to the second substrate.

12. The method of claim 8 wherein applying the force to engage the at least one hook with the at least one hoop to form the electrical contact includes causing at least one selected from the group including the at least one hook and the at least one hoop to deform to engage the at least one hook with the at least one hoop.

13. The method of claim 12 wherein causing the at least one selected from the group including the at least one hook and the at least one hoop to deform to engage the at least one hook with the at least one hoop includes causing the at least one selected from the group including the at least one hook and the at least one hoop to temporarily deform.

14. The method of claim 8 wherein applying the force to engage the at least one hook with the at least one hoop to form the electrical contact includes causing the at least one hook to engage the at least one hoop such that the at least one hook may be disassembled from the at least one hoop.

15. A hook and hoop connector assembly comprising:
a first substrate, the first substrate including at least one first alignment feature and a plurality of electrically conductive hooks arranged in a hook area; and
a second substrate, the second substrate including at least one second alignment feature and a plurality of electrically conductive hoops arranged in a hoop area, the plurality of electrically conductive hooks being arranged to engage with the plurality of electrically conductive hoops to form at least a first electrical contact,
wherein the plurality of electrically conductive hooks and the plurality of electrically conductive hoops are configured to provide redundancy, and
wherein the at least one first alignment feature and the at least one second alignment feature are configured to align the hook area with the respect to the hoop area.

16. The hook and hoop connector assembly of claim 15 wherein the plurality of electrically conductive hooks includes a first hook and a second hook, and wherein the plurality of electrically conductive hoops includes a first hoop and a second hoop, the first hook being arranged to engage the first hoop as a part of the first electrical contact, the second hook being arranged to engage the second hoop as a part of the first electrical contact.

17. The hook and hoop connector assembly of claim 15 wherein the first substrate includes at least a first electrical component communicably coupled to the plurality of electrically conductive hooks and the second substrate includes at least a second electrical component communicably coupled to the electrically conductive hoops.

18. The hook and hoop connector assembly of claim 15 wherein the first substrate and the plurality of electrically conductive hooks are formed from metal, and wherein plurality of electrically conductive hooks is a plurality of compliant hooks.

19. The hook and hoop connector assembly of claim 15 wherein the second substrate and the plurality of electrically conductive hoops are formed from metal, and wherein the plurality of electrically conductive hoops is a plurality of compliant hoops.

20. The hook and hoop connector assembly of claim 15 wherein the plurality of electrically conductive hooks is integrally formed on the first substrate and the plurality of electrically conductive hoops is bonded to the second substrate.

21. The connector assembly of claim 1 wherein each of the plurality of hooks are spaced apart between 100-200 microns.

22. The connector assembly of claim 1 wherein each of the plurality of hoops have a lateral pitch of about 35 microns or less.

23. The connector assembly of claim 22 wherein each of the plurality of hoops have a lateral pitch between 20-35 microns.

* * * * *